United States Patent [19]
Power

[11] Patent Number: 6,131,710
[45] Date of Patent: Oct. 17, 2000

[54] BRAKE SHOE ANCHOR PIN

[75] Inventor: M. Andrew Power, Montgomery, Ala.

[73] Assignee: Dana Corporation, Toledo, Ohio

[21] Appl. No.: 08/972,557

[22] Filed: Nov. 18, 1997

[51] Int. Cl.[7] .................................................. F16D 51/00
[52] U.S. Cl. ........................................... 188/330; 188/341
[58] Field of Search ........................... 188/205 R, 206 A,
188/65.1, 341, 328, 327, 334, 333, 340;
403/109.3, 152, 379.5, 379.6; 429/94; 267/162

[56] References Cited

U.S. PATENT DOCUMENTS

| | | | |
|---|---|---|---|
| Re. 31,531 | 3/1984 | Williams | 172/546 |
| 3,650,360 | 3/1972 | King | 188/330 |
| 3,894,620 | 7/1975 | Goldberg | 188/330 |
| 4,206,834 | 6/1980 | Williams | 188/341 |
| 4,270,367 | 6/1981 | Santore | 464/169 |
| 4,445,597 | 5/1984 | Baltare | 188/206 A |
| 4,858,730 | 8/1989 | Baroni | 188/205 R |
| 5,639,074 | 6/1997 | Geenhill | 267/162 |

*Primary Examiner*—Robert J. Oberleitner
*Assistant Examiner*—H. S. Sawhney
*Attorney, Agent, or Firm*—Oldham & Oldham Co., L.P.A.

[57] ABSTRACT

A pin is used to anchor an end of a brake shoe to a boss in a brake spider. The brake shoe has a pair of spaced apart ribs, each of the ribs having an aperture at an end thereof. The pin is a two-piece assembly with first and second elongate members. A first end of each of the elongate members has a trunnion formed on it, and the second end of the elongate members are sized and adapted to telescope one into the other. The trunnions are sized to be received in the rib apertures while an intermediate portion of the pin between the trunnions is sized to be received in the brake spider boss. The first and second trunnions can be compressed towards each other a sufficient distance to permit the trunnions to be disengaged from the rib apertures. A biaser is located inside the pin to urge the first and second elongate members apart from each other, to assist in maintaining the trunnions in the respective rib apertures.

7 Claims, 2 Drawing Sheets

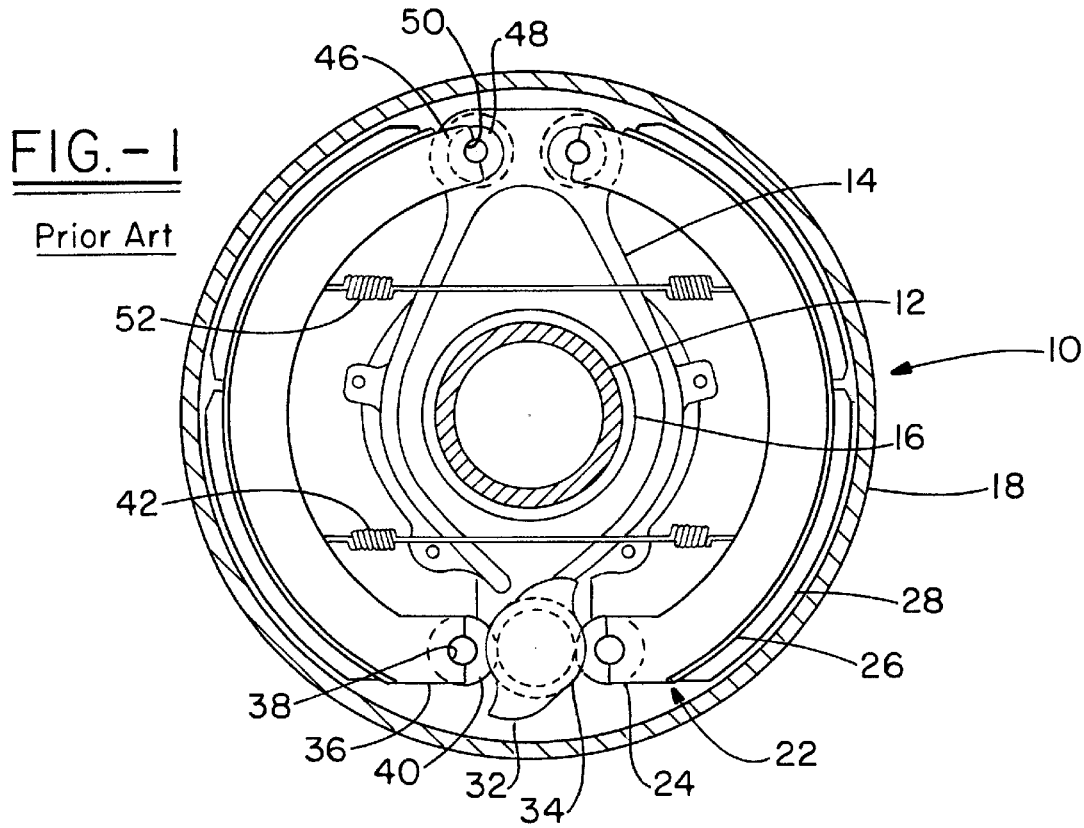
FIG.-1 Prior Art
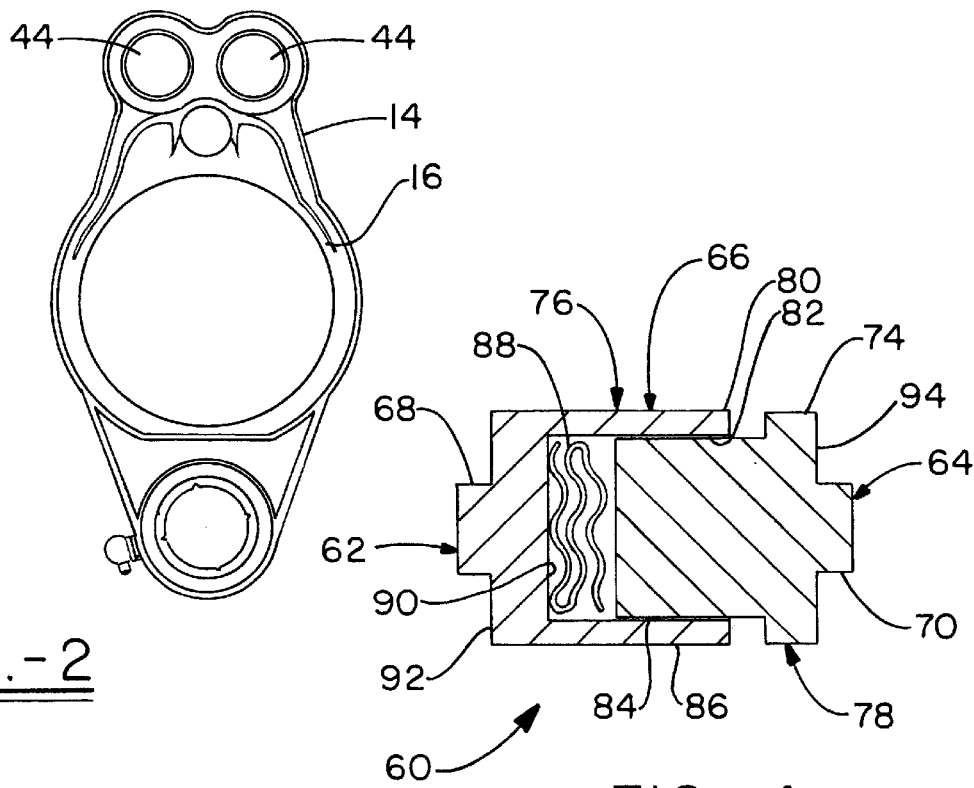
FIG.-2
FIG.-4

6,131,710

BRAKE SHOE ANCHOR PIN

The present invention relates to an improved brake shoe anchor pin for use in association with vehicle brakes. More specifically, the present invention relates to a compressible brake shoe anchor pin in which the ends of the pin are trunnions for engaging the brake shoe and the intermediate portion is a shaft for being received in the brake spider. The brake pin is a two-piece design having a biasing means to provide axial resistance when the ends of the pin are compressed. The anchor pin is used to secure a brake spider having a cylindrical aperture between a pair of parallel spaced apart ribs on a brake shoe having circular apertures at the end of the ribs. The compressibility of the anchor pin facilitates removal and replacement of the anchor pin at a maintenance facility.

BACKGROUND OF THE ART

In a drum brake assembly, it is necessary to secure a pair of brake shoe assemblies in a non-rotating manner to a wheel axle so that they may be expanded by means of a brake actuator into frictional contact with a brake drum, which rotates with the wheel. The conventional assembly method interposes a brake spider between a pair of spaced apart ribs which comprise the brake web of the brake shoe. In one type of assembly, the pair of opposed brake shoes have ribs with open apertures at one end of the ribs, and these open apertures are each held by biasing springs against trunnions on the ends of an anchor pin which passes through an aperture in the brake spider. In another type of assembly, which is the preferred type for use of the present invention, each of the pair of opposed brake shoes has ribs with a closed aperture at the end of the brake shoe. The apertures on the spaced apart ribs are aligned so that they may receive the trunnions on the ends of the anchor pin, which passes through the brake spider. In this type of assembly, two anchor pins are used, one with each of the brake shoes, so there are two apertures in the brake spider also. These anchor pins are conventionally held in place by a combination of snap rings and washers, and they are typically one-piece pins, which are press fit into position in the factory. Although reliable, such straight anchor pins which require this level of assembly are difficult to replace away from the factory.

SUMMARY OF THE INVENTION

It is therefore an object of the present invention to provide a brake shoe anchor pin wherein the pin is compressible and may be easily removed by compressing both ends of the pin toward each other for removal from the spaced apart ribs of the brake shoe. This and further objects of the invention are achieved by a pin for anchoring a brake shoe to a brake spider. The brake shoe has a pair of spaced apart ribs, each of the ribs having an aperture at an end thereof and the to a brake spider has a bore therethrough. The pin comprises first and second trunnions to be received in the rib apertures and an intermediate portion between the first and second trunnions adapted to be received in the brake spider bore, such that the first and second trunnions can be compressed towards each other a sufficient distance to be disengaged from the respective rib apertures.

BRIEF DESCRIPTION OF THE DRAWINGS

A better understanding of the invention will be had by reference to the accompanying text and drawings, wherein identical parts are identified by identical reference numbers and wherein:

FIG. 1 shows a side elevation view of a prior art wheel assembly;

FIG. 2 shows an side elevation view in isolation of a brake spider of the prior art wheel assembly;

FIG. 4 is enlarged side sectional view of the anchor pin of the present invention.

DETAILED DESCRIPTION OF THE PREFERRED EMBODIMENT

Figure 3:
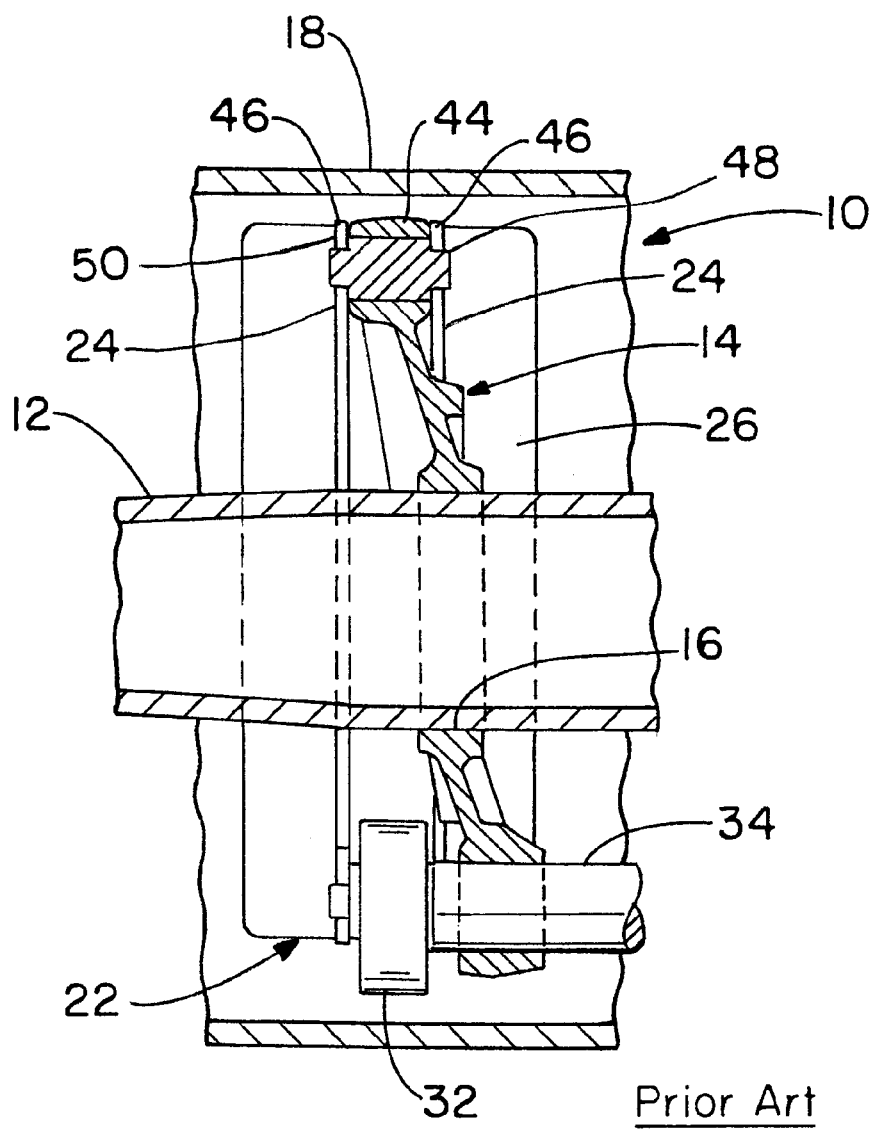
FIG. 3 shows a front elevation view of the prior art wheel assembly.

FIG. 1 shows a drum brake assembly 10 as is generally known in the prior art. It is typical of the type of brake found on heavy duty trucks and trailers. The drum brake assembly 10 is supported on an axle 12 by a spider 14 which is rigidly affixed, as by welding, to the axle. The spider 14 has a central opening 16 through which the axle 12 passes and the edges of the opening provide a site for the welding of the spider to the axle. A brake drum 18 surrounds the rest of the assembly and is affixed to a wheel (not shown) which is rotatably mounted to a spindle of the axis in a manner well known in the art. The brake spider, by contrast, does not rotate. A pair of brake shoes 22 is included in the brake assembly. Each of the brake shoes 22 has a pair of axially spaced webs 24 secured to a brake table 26 on which brake friction pads 28 are rigidly mounted. The webs 24 are flat in a radial direction and curved in a longitudinal or circumferential direction. The brake table 26 is curved in the circumferential direction and the webs 24 are welded in a parallel relationship along the interior curved portion of the table. The brake friction pads 28 are secured to the brake table by rivets, chemical bonding or the like.

Selective outward movement of the brake shoes 22 produces frictional engagement of the friction pads 28 with the inside surface of the brake drum 18. This outward movement is achieved by a brake actuator, which includes a cam 32 which is rigidly secured to a cam shaft 34, which passes through an aperture 35 in the spider 14. When the cam shaft 34 is rotated by known brake means (not shown), the cam's shape causes the selective outwardly movement of the brake shoes. A roller or cam follower 40 may be seated in an opening 38 provided at a first end 36 of each of the brake shoes, preferably on the brake shoe webs 24. Each of the cam followers 40 bears directly in a rolling engagement against the cam 32. Holding the cam followers 40 in that engaged position is a first biaser 42, usually a spring, which connects each of the brake shoes 22, near the first end 36. As the cam shaft 34 turns and the cam 32 rotates, the force of first biaser 42 is overcome and the brake tables 26 move outwardly, but as the cam rotates back to its normal, non-actuated position, the tables move inwardly, disengaging the brake drum 18.

As best seen in FIG. 3, the end of the spider 14 opposite the cam 32 is axially offset from the end which receives the cam. This offset permits the spider 14 to be interposed between the spaced apart webs 24 of the respective brake shoes 22. At least one boss 44 is provided at this end of the spider 14, for the purpose of securing a second end 46 of the brake shoes 22 to the spider through the use of an anchor pin 48. The second end 46 of each brake shoe web is provided with an opening 50, comprising either an aperture or a slot, for accepting the ends of the anchor pin 48, which extend axially outward from the anchor pin aperture. In the particular embodiment shown in FIG. 1, two such bosses 44 are provided, so that each brake shoe 22 has its own anchor pin 48. In other known embodiments (usually involving less strenuous service), a single boss and anchor pin may be used, with each of the brake shoes having its slot 50 engaging a portion of the circumference of the ends of the single anchor pin. In such a case, an open slot 50 is used rather than a closed aperture. When two anchor pin apertures 44 and anchor pins 48 are employed, as in FIG. 1, the brake webs may have either a closed aperture or an open slot, although the closed aperture is generally preferred. This preference is due to the superior attachment which may be achieved through the use of the closed aperture. The anchor pin or pins 48 provide a pivot point about which end 46 of the brake shoe is able to make the outward braking movement described above. A second biaser 52, usually a spring like the first biaser 42, connects each of the brake shoes 22, near the second end 46, urging the brake tables into the non-actuated inward position in the same manner as the first biaser.

Some aspects of this prior art wheel assembly will be better understood when reference is also made to FIG. 2, which shows the brake spider 14 in a side view. Of particular note are the anchor pin apertures 44 wherein the anchor pins 48 are inserted. Yet further aspects are understood when reference is made to FIG. 3, which shows a side sectional view of the prior art wheel assembly, disclosing an anchor pin 48. The anchor pin 48 has a stepped structure with trunnion ends, but is used with open-ended apertures 50 instead of closed-periphery apertures. When the brake shoe web end 46 has a closed periphery apertures 50, it has been typical in the prior art to use an anchor pin 48 which has an essentially constant diameter throughout its entire length. When such an anchor pin 48 is used, it may be slipped through the aligned apertures 50 of the brake shoe as it straddles the spider 14 with the spider boss 44 in alignment with the apertures. The anchor pin 48 would then be retained in place using snap rings or the like. This is because the prior art does not teach a stepped diameter anchor pin with end trunnions of a smaller diameter for use in association with a closed periphery aperture at the brake shoe end. Such stepped diameter anchor pins 48 are known only in association with open-ended apertures, in which case the anchor pin is usually press fit into the anchor pin aperture 44, an operation which is not as easily accomplished out in the field as in the factory.

The present invention is a pin for anchoring a brake shoe in a brake spider having a bore through the spider. As shown in side sectional view in FIG. 4, the anchor pin 60 has a first trunnion 62 at a first end of the pin and a second trunnion 64 at the second end. Each of the trunnions 62, 64 has a diameter suitable for it to be slidingly received into a closed periphery aperture at the end of the web of the brake shoe, and a length sufficient to secure the pin 60 in the aperture. In the preferred embodiments of the invention, the first and second trunnions 62, 64 have the same diameter, so that the anchor pin 60 may be inserted without particular reference to direction, although it may be useful in some applications to distinguish between the inboard and outboard sides of the pin and the brake shoes by varying the diameter of the trunnions and the respective apertures so that only one orientation will work. An intermediate portion 66 of the pin 60 between the first and second trunnions 62, 64 respectively is provided with an outside diameter suitable to be received in the brake spider bore, and this outside diameter is larger than the diameter of either the first or second trunnion, so that a stepped pin results. The pin 60, as will be described further below, is constructed so that the first and second trunnions 62, 64 can be compressed towards each other a sufficient distance to be disengaged from the respective rib apertures.

One method of achieving this anchor pin 60 is shown in sectional view in FIG. 4. Such an anchor pin 60 is formed from a first elongate member 76 and a second elongate member 78. Each of the elongate members 76, 78 has a first end 68, 70 respectively, and a second end 80, 84 respectively. The first end 68, 70 of each elongate member 76, 78 comprises a trunnion, and, in the preferred embodiment, these trunnions are sized identically in terms of length and outside diameter. The second ends 80, 84 of the elongate members are different, so that they may coact in a telescoping manner. One method to achieve this coaction is to have the second end 80 of the first elongate member 76 be provided with a bore 82 and to have the second end 84 of the second elongate member 78 be sized and adapted to be slidingly receivable in the bore 82. When this is done, the first elongate member 76 may also be provided with a generally cylindrical outside surface 86 which is sized with an outside diameter appropriate for being received inside the brake spider boss or aperture 44. The bore 82 inside the first elongate member 76 will have an inside diameter and depth defined by the distance between the second end 80 of the first elongate member 76 and the base or bottom 90 of the bore 82. The inside diameter of this bore 82 will be somewhat larger than the outside diameter of the second end 34 of the second elongate member 78 so that the second end of the second elongate member slides easily inside the bore. In the preferred embodiments of the invention, the bore 82 will have a biaser 88 positioned into the bore so that the biaser will act between the first and second elongate members 76, 78 to resiliently resist compression of the trunnion 62 on the first elongate member towards the trunnion 64 on the second elongate member. This biaser 88 is preferably interposed between a bottom 90 of the bore in the first elongate member and the second end 84 of the second elongate member so that axial movement of the second end of the second elongate member towards the towards the bottom surface of the bore is actively resisted. An appropriate biaser 88 for this application would be a spring, particularly a spring formed from a resilient metallic material. In some applications, the spring would be a helical spring, and in certain other applications the spring would be a wave spring, as is particularly shown in FIG. 4.

In the preferred embodiments of the invention, the second elongate member 78 has a shoulder 74 formed along an intermediate portion to limit axial movement of the second end 84 of the second elongate member 78 into the bore 82 of the first elongate member 76. This shoulder 74 may be an extension of the step in the diameter of the second elongate member which distinguishes the trunnion formed at the first end from the remainder of the member.

The biaser 88 which is used in the bore should have a sufficient range of compression available so that the trunnions 62, 64 in the pin 60 may be completely disengaged from the respective apertures in the ribs of the brake shoe when the biaser is in a fully compressed state but the trunnions will be under some level of compression when the trunnions are seated in the apertures with a stepped diameter shoulder at the base of the trunnion being compressively urged against the periphery of the aperture on the facing faces of the ribs.

In use, a person assembling the brake assembly would either place an assembled pin 60 into the spider bore 44 or assemble the pin in the anchor pin aperture by placing the first elongate member 76 into the anchor pin aperture 44 from one side and then inserting the biaser 88 and the second elongate member 78 into the first elongate member's bore 82 from the opposite site of the anchor pin aperture. By compressing the stepped diameter shoulders at the base of the respective trunnions 62, 64 towards each other and inwardly towards the anchor pin aperture 44 by an appropriate tool, a brake shoe having the closed periphery apertures may be positioned so that the apertures are aligned with the anchor pin aperture. By releasing the compression of the tool, the biaser 88 will act within the pin 60 to urge the trunnions 62, 64 outwardly into a seated position in the apertures. In the preferred seated position, the shoulder surfaces 92, 94 found at the base of the respective trunnions 62, 64 will bear lightly against the periphery of the apertures in the brake shoe webs, with the full length of the trunnions 62, 64 being inserted into the web apertures. To be able to easily disengage the pin 60, the pin should be able to be compressed an amount at least equal to the sum of the lengths of the trunnions 62, 64.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An improved brake assembly for a wheel having a brake spider with a central opening through which the spider is mounted on an axle, a cam shaft with a cam at an end thereof, the end rotatably extending through an aperture in the spider, a pair of brake shoes each having a pair of axially spaced apart webs, such that a first end of the pair of webs straddle the spider at a pair of anchor pin apertures, the first end of each pair of webs having a mounting aperture therethrough, alignable with one of the anchor pin apertures, a second end of the pair of webs having a cam follower mounted therein, a first and a second biaser under tension to connect the pair of brake shoes to each other in a manner forcing the cam followers against the cam, wherein the improvement comprises:

a pair of anchor pins extending through the anchor pin apertures of the spider for anchoring the brake shoes through the aperture of each web at the first end of the brake shoes, the pair of anchor pins each having a first and a second trunnion at the respective ends thereof with an intermediate portion therebetween, the first and second trunnions being received in the mounting apertures and the intermediate portion being received in the corresponding anchor pin aperture in the brake spider, wherein each said anchor pin is axially compressible such that a stepped diameter shoulder at the base of each of the trunnions will be compressively urged against a periphery of the mounting apertures and the trunnions can be restorably compressed towards each other sufficiently to be disengaged from the mounting apertures.

2. The improved brake assembly of claim 1, wherein the compressed length of each said pin is less than the perpendicular distance between the pair of webs.

3. The improved brake assembly of claim 1, wherein each of the pins comprises a first and a second elongate member, each of the elongate members having first and second ends, with the first ends of the elongate members comprising the trunnions and the second ends coacting in a telescoping manner.

4. The improved brake assembly of claim 3, wherein the second end of the first elongate member has a bore formed therein and the second end of the second elongate member is sized and adapted to be slidingly received in the bore.

5. The improved brake assembly of claim 4, wherein a spring is interposed between a bottom surface of the bore in the first elongate member and the second end of the second elongate member and provides resistance to axial movement of the second end of the second elongate member in the bore towards the bottom surface of the bore of the first elongate member.

6. The improved brake assembly of claim 5, wherein the second elongate member has a shoulder formed along an intermediate portion thereof to limit axial movement of the second end of the second elongate member into the bore of the first elongate member.

7. The improved brake assembly of claim 6, wherein the spring has a sufficient range of compression from an uncompressed state to a fully compressed state such that the trunnions on the elongate members will be compressively seated in the web apertures under compression provided by the spring.

* * * * *